United States Patent [19]

Schmitz et al.

[11] 4,294,064
[45] Oct. 13, 1981

[54] METHOD OF AND A DEVICE FOR BALANCING A CHANGING LOAD OF A STRIP ROLL ORBITING ABOUT AN AXIS IN A STRIP WINDING MACHINE

[75] Inventors: Günther Schmitz, Odenthal; Hans Kierdorf, Cologne, both of Fed. Rep. of Germany

[73] Assignee: Felten & Guilleaume Carlswerk, Cologne, Fed. Rep. of Germany

[21] Appl. No.: 115,288

[22] Filed: Jan. 25, 1980

[30] Foreign Application Priority Data

Jan. 1, 1979 [DE] Fed. Rep. of Germany ....... 2903807

[51] Int. Cl.³ .......................................... B65H 81/06
[52] U.S. Cl. .............................................. 57/3; 57/6; 57/15
[58] Field of Search ....................... 57/3, 6, 13, 15, 31, 57/32, 264, 58.72, 127.5, 127.7, 19

[56] References Cited

U.S. PATENT DOCUMENTS

| | | | |
|---|---|---|---|
| 2,316,613 | 4/1943 | Nystrom et al. | 57/15 |
| 2,322,391 | 6/1943 | Reynolds | 57/3 |
| 2,362,665 | 11/1944 | Reynolds | 57/15 |
| 2,365,840 | 12/1944 | Reynolds | 57/15 |
| 2,366,087 | 12/1944 | Chernack | 57/15 X |
| 3,137,985 | 6/1964 | Bailey | 57/13 |

*Primary Examiner*—Donald Watkins
*Attorney, Agent, or Firm*—Michael J. Striker

[57] ABSTRACT

The method of balancing a changing load of a strip roll orbiting about an axis in a strip winding machine comprises the steps of measuring the changing diameter of the strip roll, converting the measured change into electrical control pulses fed to a reversible variable speed motor moving a counterbalancing weight orbiting about the axis at the other side of the strip roll.

14 Claims, 3 Drawing Figures

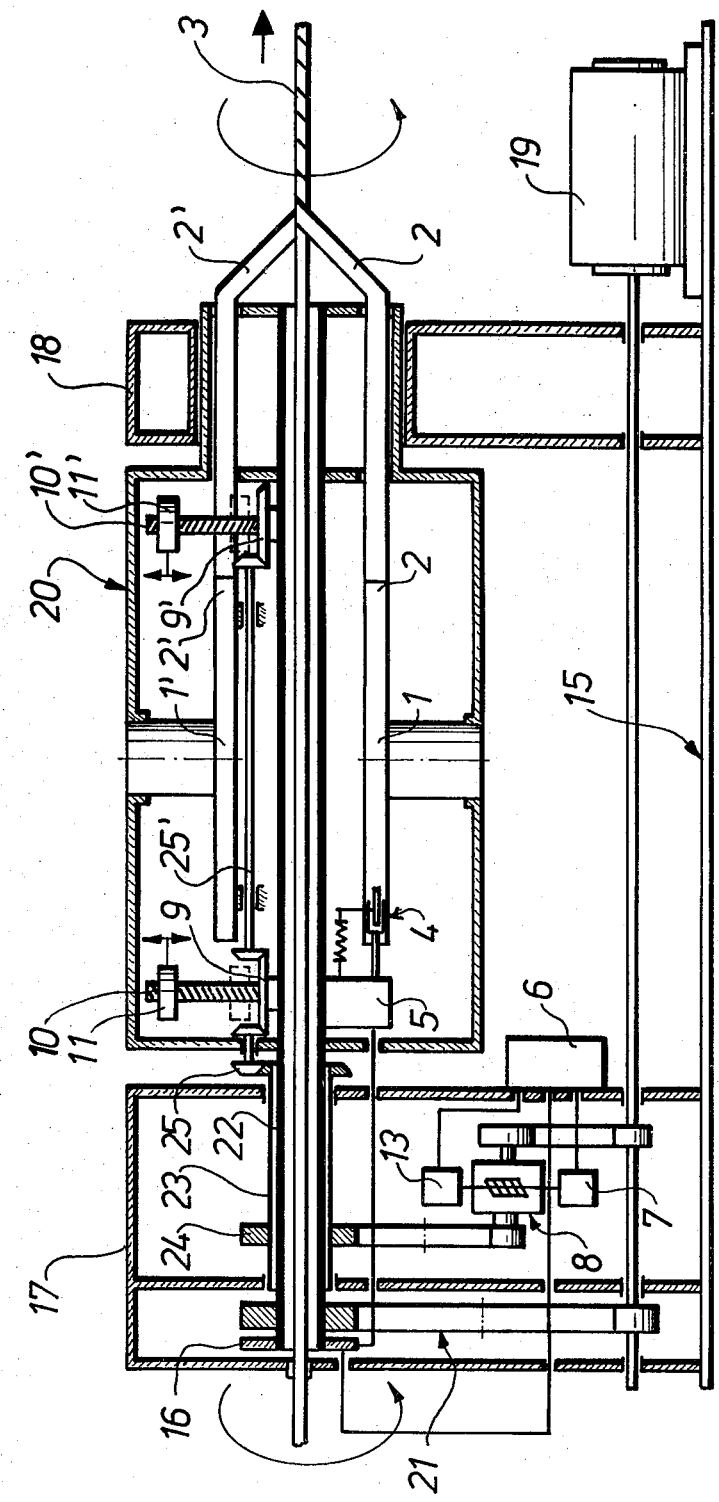

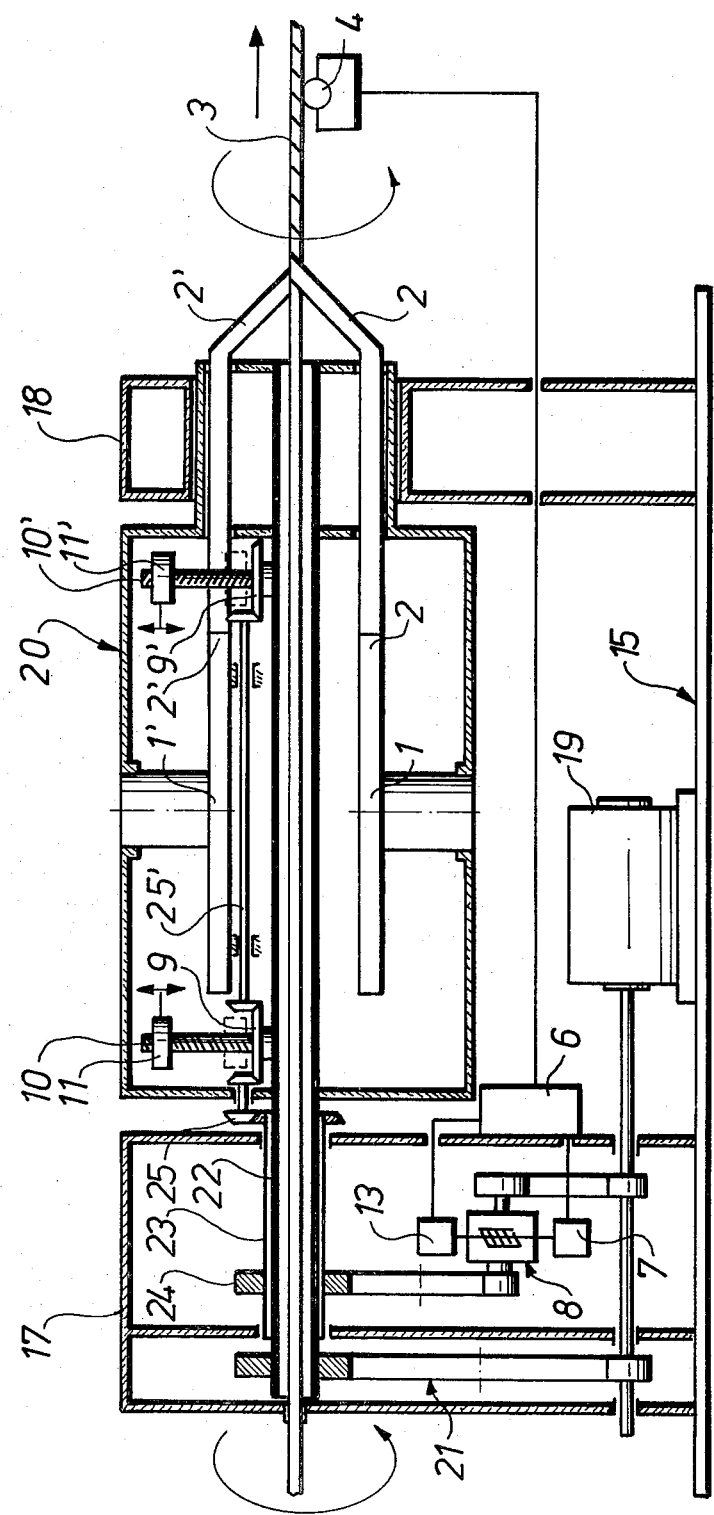

;# METHOD OF AND A DEVICE FOR BALANCING A CHANGING LOAD OF A STRIP ROLL ORBITING ABOUT AN AXIS IN A STRIP WINDING MACHINE

BACKGROUND OF THE INVENTION

The present invention relates in general to a strip winding machine and in particular to a method of and a device for continuously balancing a changing load of a strip roll orbiting about an axis in the strip winding machine.

The invention is applicable especially in the strip winding machine of the type where the strip roll is arranged at one side of the axis only or where similar unequally loaded strip rolls are used for winding the strip around an electrical cable, especially in the production of high frequency co-axial cable.

In the case when two or more strips or tapes of metal, paper or plastic are simultaneously wound around a rope-like product such as a cable for example, the winding head of the machine is usually constructed such as to be in balanced condition during the winding process.

In the case when due to the construction of the processed cable only one strip or band is to be wound or when two strips are wound one after the other in opposite directions, this balance condition during the winding process does no longer take place; that means the winding head is operated at an imbalanced position.

The imbalance in unitarily loaded double head strip winding machines is usually compensated only partially by employing a counter balancing weight having half the weight of that of the head disk together with the strip roll supported on the latter. As a consequence, when the head disk is fully loaded the imbalance in the magnitude of a half head disk takes place at the side of the disk, whereas when the head disk becomes unloaded or empty the imbalance in the magnitude of half head disk occurs at the side of the counter balancing weight. This system is in a temporary balance only when a half of the strip load is unwound while in the remaining operational conditions an imbalance prevails which, particularly at large weights of the loaded head disk and at high rotational speeds, has extremely disturbing effects. The disturbances show themselves in the form of an increased non uniform wear in the bearings, an increased irregularity of rotary motion and the development of noise and vibrations. For these reasons the normal operational speed of unilaterally loaded strip winding machines has to be considerably reduced when larger weights of the strip rolls are employed.

This solution however, is very unsatisfactory inasmuch the utilization of the machine is inferior and the disturbing effects of the imbalance still strongly affect the quiet motion of the machine and the working life of its bearings in spite of the reduced rotary speed of the latter.

The aforementioned disadvantages are particularly critical in the case when the winding machines are installed in multi-floor production buildings because resultunt vibrations of the machine are transferred through the building and through the other production machinery and may cause interference with sensitive controlling and regulating units.

SUMMARY OF THE INVENTION

It is therefore a general object of the present invention to overcome the aforementioned disadvantages.

More particularly, it is an object of the invention to provide an improved method of and a device for balancing a changing load of a strip roll, which is not possessed of these disadvantages.

An additional object of the invention is to provide such an improved method and device which continuously equalizes the imbalance of unilaterally loaded strip winding machines in response to the diminishing diameter of the roll of the strip during the winding operation.

In keeping with these subjects and others which will become apparent hereafter, one feature of the invention resides, in the step of continuously measuring the changing diameter of the strip roll orbiting about the machine axis and displacing proportionary to the measured change a counter balancing weight orbiting about the axis at the other side of the strip roll.

In a preferred embodiment of this invention, a measured change of the diameter is converted into corresponding electrical impulses for controlling displacement means for the counter balancing weight. The measurement of the diameter of the roll is effected by mechanical or optical means.

In another embodiment of this invention, the unwrapped strip length is continuously measured and the measured value is converted into the control pulses which are supplied to a control unit for the drive means of the counter balancing weight.

The device for carrying out the method of this invention in a single or double head strip winding machine comprises a winding head disk supported for rotation about a first axis and for orbiting about a second axis to carry a strip roll to be unwound; a counter balancing weight displacable around the third axis extending in alignment with the first axis at the other side of the second axis; a sensor for measuring the diminution of the strip roll during the winding operation and for producing control signals proportional to the diminution; and drive means for the counter balancing weight controlled by the control signals. The sensor generates preferably electric control signals and the drive means includes a variable speed electric motor driving via transmission gears a threaded spindle engaging the counter weight and displacing the same about the third axis. Preferably, the sensor cooperates with a pulse generator and a computing device which establishes an error signal corresponding to the difference between a nominal value and an actual value of the weight of the strip roll and displaces the counter balancing weight in radial direction proportionary to the error signal.

The novel method makes it possible that the attending personnel of the machine need not perform any adjustments during the operation of the machine. Instead, the operator before the starting of the machine, enters in the computing device the necessary parameters such as the width of the strip, the thickness of the strip material and the like. The computing device can be connected at a central station to several winding machines and also the pulse generators for the machines can be arranged at the central station. Upon the start of the machine, the equalization of the imbalance of respective machines takes place automatically during the winding operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a schematic sectional side view of a double disk strip winding machine having a stationary variable speed motor for driving the balancing device; and FIG. 3 is a schematic sectional side view of another double disk strip winding machine having a stationary measuring device for continuously measuring the diminution of the diameter of the strip roll.

DESCRIPTION OF THE PREFERRED EMBODIMENTS

Figure 1:
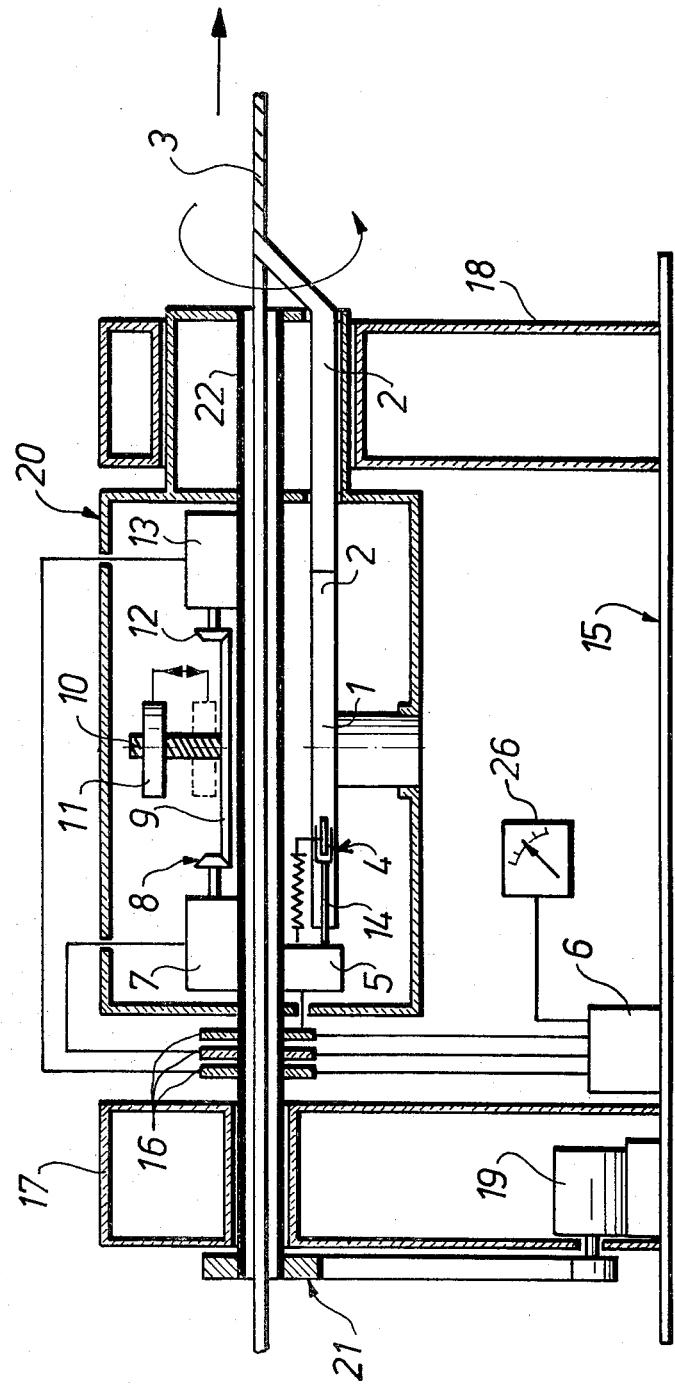
FIG. 1 is a schematic sectional side view of a single-head strip winding machine equipped with the device for the automatic balance equalization.

Referring firstly to FIG. 1, there is illustrated an embodiment of a single head strip winding machine including a head disk 1 for supporting strip roll 2. The strip 2 is taken off the strip roll and is wound around a cable 3 which is advanced in the direction indicated by the arrow and finally coiled on a cable reel.

The strip winding machine has a winding head 20 rotatable in bearings 17 and 18 of a machine frame 15 mounted on a common base plate. In this embodiment, the winding head 20 supports for rotation about the first axis a single head disk 1. In order to continuously measure the decrease in diameter of the strip roll 2', a measuring instrument 4 is arranged inside the winding head 20 to rotate therewith. The measuring instrument 4 includes a pivotable lever 14 which is spring biased against centrifugal force and provided at its free end with a sensing roller engaging the periphery of the strip roll 2'. The lever 14 controls potentiometer 5 which produces an electrical signal proportional to the angular displacement of the lever 14 which is a measure of the diameter of the strip roll 2'. The output signal from the potentiometer 5 is fed to a computing and pulse generating device 6 which generates control pulses in response to the previously entered data relating to the characteristic values of the employed strip 2 and in response to the applied output from the potentiometer 5. The control pulses are fed to a variable speed electro motor 7 which drives via transmission gears 8 and 9 on threaded spindle 10 which displaces a counter balancing weight 11. The spindle 10 extends in alignment with the axis of rotation of the head disk 1 at the other side of the axis of rotation of the winding head 20 and thus determines the radial position of the weight 11 in the limits as indicated by arrows.

The adjustment of the counter balancing weight 11 is detected by an additional pinion 12 connected to a shaft of an angle-to-signal transducer 13 connected to a computing and signal generating device 6 for feeding back the actual value of the position of the weight 11. The transducer 13 can be made also in the form of a potentiometer which supplies its output signal via one of the sliding contact rings 16 to the device 6. In the device 6, the actual value signal is compared with the nominal value signal from the potentiometer 5 of the measuring instrument 4 and the difference or error signal is applied via another of the slide contact rings 16 to the variable speed electric motor 7. As mentioned above, the device 6 also modifies the error signal according to the previously entered parameters of the strip 2 and by applying the output signal to the reversible and variable-speed electromotor 7 the adjustment process is completed. The adjustment processes thus take place in minute steps the magnitude of which depends on the sensitivity of the employed instruments and on the magnitude of data stored in the computing device 6. Due to the small size of these adjustment steps the quality of the balance restoring process is not impaired.

It is advantageous when the position repeating actual-value generator or angle-to-signal converter 13 or the nominal value generator or measuring instrument 4 with the potentiometer 5 or if desired the computing and control signal generating device 6 is provided with an indicator 26 which indicates the displacement of the counter balancing weight 11 or the load of the head disk 1. The indicator 26 can cooperate with a non-illustrated switch which turns off the driving electro motor 19 and stops the operation of the winding machine after the whole strip 2 has been discharged from the disk 1 and the counter balancing weight 11 has attained its lower-most position as indicated in dashed lines.

In a modification, the decreasing diameter of the strip roll 2 can be measured by means of a stationary measuring device 4' which measures the length of the discharged strip 2. This arrangement has the advantage of a simpler construction of the winding head 20 which in addition has more room for accomodating a head disk 1 of a larger diameter for supporting a corresponding strip roll. In this arrangement the computing and control pulse generating unit 6 is supplied with additional stored data and program for converting the measured length to the diameter value.

FIG. 2 shows a modification of the winding machine of FIG. 1, namely a strip winding machine having a winding head with two head disks 1 and 1' arranged opposite each other and each being provided with separate balancing device of this invention. This modification is structurally more complicated than the machine of FIG. 1 nonetheless, it is applicable for various modes of operation. In one mode of operation the winding head 20 accommodates only one strip roll on one of the disks 1 or 1' whereby the measurement of the diameter of the roll as well as the adjustment of the balancing weight 11 and 11' takes place in similar manner as described above in connection with the machine according to FIG. 1. In another mode of operation both head disks 1 and 1' are loaded with equal or different strip rolls. In the latter case, the strips may differ both as their width or the quality of their material. In this embodiment, there are employed two counter balancing weights 11 and 11' which are simultaneously operated to compensate for unequal balancing forces or, when the strip rolls on both disks 1 and 1' are equal, the weights remain in zero position.

Still another modification of the balancing device for winding machines of this invention is illustrated in FIG. 3. The component parts in FIGS. 2 and 3 having the same function as the parts in FIG. 1 are designated by like reference numerals whereby the duplicated parts are indicated by primes. The modification of FIG. 3 can be similarly as that of FIG. 2 a winding head provided with a single head disk or with two head disks.

In FIGS. 2 and 3, the main difference with respect to FIG. 1 is the provision of a stationary controlling motor 7 acting as the drive means for the balancing device. The motor 7 is secured to the frame of the machine outside the rotary winding head 20. In FIG. 2, the measurement of the diameter of the strip roll 2 from which the values for the adjustment of the counterbalancing weight are derived, is effected in the same manner as in FIG. 1 whereby the control signals from the potentiometer 5 are applied via slide ring 16 to the stationary computing and control pulse generating device 6 which is arranged on the stationary frame 15. The output control signals from the device 6 are fed to the stationary control motor 7 which drives via differential gears 8 and additional transmission elements 23, 24, 25 and 25' both spindles 10 and 10' driving the two counterbalancing weights 11 and 11'. Each of the threaded spindles 10 and 10' is connected to a bevel gear 9 and 9' driven by the power transmitting bevel pinions 25. The bevel gears are interconnected by a coupling shaft 25'. The driving motor 19 of the winding machine drives via transmission 21 such as transmission gears or a belt transmission a hollow shaft 22 which supports for joint rotation the winding head 20. The transmission gears 24 and 25 are rotatably supported on the hollow shaft 22 and are coupled to the differential gears 8 which, when actuated by the control motor 7, transmit the movement of the latter to the weights 11 and 11' in response to the output pulses from the computing and control pulse generating unit 6.

The transmission gear 24 is mounted on an additional hollow shaft 23 supported for rotation on the first-mentioned hollow shaft 22 and being terminated with a bevel gear engaging the beveled pinion 25. The operation of the parallel counterbalancing weights 11 and 11' is the same as that explained above in connection with FIG. 1. The bevel gear plates 9 and 9' can engage nonillustrated angular signal converters which feed back the actual value signals to the computing and pulse generating device 6.

The embodiment of the strip winding machine according to FIG. 3 has similarly as in the preceding example a winding head 20 provided with two head disks 1 and 1' and with two parallel counterbalancing weights 11 and 11'. The measuring instrument 4, however, is stationary and measures the length of the unwound strip 2. The control motor 7 together with the transmission gears for transmitting the adjusting movements to respective weights 11 and 11' are arranged in the same manner as in the machine of FIG. 2. This embodiment is suitable particularly for highspeed winding machines and similarly as the machine according to FIG. 2 is operable without any imbalance even if only one head disk is loaded and the same rotational speed is employed.

It will be understood that each of the elements described above, or two or more together, may also find a useful application in other types of constructions differing from the types described above.

While the invention has been illustrated and described as embodied in the specific examples of the strip winding machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of balancing a changing load of a strip roll orbiting about an axis in a strip winding machine, comprising the steps of continuously measuring the changing diameter of the strip roll, and displacing proportionary to the measured change of the diameter a counterbalancing weight orbiting about said axis at the other side of said strip roll.

2. The method as defined in claim 1, wherein said measured change of the roll diameter is converted into corresponding electrical control pulses for controlling displacement means for said counterbalancing plate.

3. The method as defined in claim 2, wherein said change is measured mechanically.

4. The method as defined in claim 2, wherein said change is measured optically.

5. The method as defined in claim 2, wherein the change in the diameter of the strip roll is ascertained by measuring the length of the unwound strip and the diameter change is computed from the measured length.

6. A strip winding machine, including a stationary frame, a winding head rotating about a first axis, at least one head disk supported in said winding head for rotation about a second axis which is perpendicular to said first axis and being adapted for carrying a strip roll, comprising a device for balancing the changing load of said strip roll, the device including a counterbalancing weight displaceable about a third axis extending perpendicularly to said first axis opposite said second axis; means for measuring the change of the diameter of the strip roll during the winding operation and for producing control signals corresponding to the measured change; and drive means for said counterbalancing weight controlled by said control signals.

7. The strip winding machine as defined in claim 6 wherein said measuring means includes a computing device, a pivotable feeler engaging the periphery of said strip roll, a converter coupled to said feeler and delivering to said computing device a nominal signal corresponding to the change of the diameter of said strip roll, an additional angle to signal converter coupled to said counterbalancing weight and delivering to said computing device an actual value signal corresponding to the displacement of said weight whereby said computing device computes a different signal and converts the same to corresponding control pulses delivered to said drive means.

8. The strip winding machine as defined in claim 7, wherein said drive means includes a reversible variable speed electromotor, a threaded spindle extending along said third axis and engaging said counterbalancing weight, and transmission means between said motor and said spindle.

9. The strip winding machine as defined in claim 8, wherein said computing and control signal generating device is arranged on said frame of said machine, said electro motor together with said transmission means being arranged in said rotating winding head and being coupled to said computing device via a sliding ring.

10. The strip winding machine as defined in claim 9, wherein said electro motor is arranged on said stationary frame of said winding machine and being coupled to said threaded spindle for said counterbalancing weight by means of differential transmission gears.

11. The strip winding machine as defined in claim 7, wherein said pivotable feeler includes a pivotable lever having at its free end a roller engaging the periphery of said strip roll and said angle to signal converter including a potentiometer coupled to said pivotable lever and delivering to said computing device said nominal signal.

12. The strip winding machine as defined in claim 6, wherein said measuring means includes a stationary length measuring device engaging the unwound strip and converting the measured length into electrical signals delivered to said computing device which in turn computes said nominal value signal.

13. The strip winding machine as defined in claim 7, wherein said stationary frame supports for rotation about said first axis a hollow shaft driven by a main driving motor, said reversible and variable speed motor being mounted on said stationary frame and said transmission gear coupling said variable speed motor to said threaded spindle being arranged on an additional hollow shaft rotatable on said first-mentioned hollow shaft.

14. The strip winding machine as defined in claim 7, further including an indicator coupled to said computing and control signal generating device to indicate the actual displacement of said counterbalancing weight.

* * * * *